United States Patent Office 3,125,569
Patented Mar. 17, 1964

---

3,125,569
3-AMINO-2,2,4,4-TETRAALKYLCYCLOBUTANOLS
James C. Martin and Edward U. Elam, Kingsport, Tenn., assignors to Eastman Kodak Company, Rochester, N.Y., a corporation of New Jersey
No Drawing. Filed Nov. 25, 1960, Ser. No. 71,399
3 Claims. (Cl. 260—563)

This invention relates to cyclobutane derivatives.

It is an object of this invention to provide a new class of cyclobutane derivatives containing amino and hydroxyl groups.

It is another object of this invention to provide novel cyclobutane derivatives useful for preparing high molecular weight poly(amide-esters).

These and other objects of the invention will be apparent from the description and claims which follow.

The cyclobutane derivatives of the invention have the following structural formula:

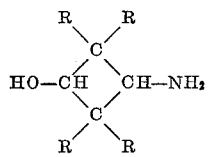

The substituent R in the above structural formula is an alkyl radical having 1 to 8 carbon atoms. Typical alkyl substituents include methyl, ethyl, n-propyl, isopropyl, n-butyl, isobutyl, n-amyl, n-hexyl, n-heptyl, ethylhexyl, n-octyl, etc. Mixtures of various alkyl substituents can comprise the compounds of the invention. For example, 3-amino-2,4-di-n-butyl-2,4-diethylcyclobutanol is an illustrative compound of the invention having mixed alkyl substituents. A particularly useful compound of the invention is 3-amino-2,2,4,4-tetramethylcyclobutanol.

The cyclobutane derivatives of the invention can be prepared from the corresponding 2,2,4,4-tetraalkyl-1,3-cyclobutanediones. One procedure is to react such diones with hydroxylamine to form a 2,2,4,4-tetramethyl-1,3-cyclobutanedione monoxime. The resulting monoxime is then hydrogenated to produce the cyclobutane derivatives of the invention. An alternative procedure for preparing the cyclobutane derivatives of the invention is to partially hydrogenate a 2,2,4,4-tetraalkyl-1,3-cyclobutanedione to the corresponding 3-hydroxy-2,2,4,4-tetraalkylcyclobutanone, to react the resulting reaction product with hydroxylamine to form a 3-hydroxy-2,2,4,4-tetraalkylcyclobutanone oxime and thereafter to hydrogenate the resulting oxime to the cyclobutane derivatives of the invention. These two methods for preparing the cyclobutane derivatives of the invention are summarized by the equations below:

The cyclobutane derivatives of the invention contain hydroxyl and amino groups. Such compounds have utility in the preparation of high molecular weight poly (amide-esters). Such polymers can be cast or molded into useful items of commerce or melt spun into useful textile fibers. A useful polymeric plastic material prepared from a typical cyclobutane derivative of the invention is described in Example 6 below. The cyclobutane derivatives of the invention can also be utilized as modifying agents for polyesters.

The invention is illustrated by the following examples of preferred embodiments thereof.

Example 1

A solution of 69.5 g. (1.0 mole) of hydroxylamine hydrochloride in 140 ml. of water was added slowly to a solution of 140 g. (1.0 mole) of 2,2,4,4-tetramethyl-1,3-cyclobutanedione and 81.5 ml. of pyridine in 2800 ml. of ethyl alcohol at 15–20° C. The addition required seven hours. The solution was then stirred for two days at room temperature. The solvent was removed at room temperature by distillation at room temperature and slow evaporation in an open dish. The crystalline residue was washed repeatedly with water, dried, and suspended in 1500 ml. of boiling chloroform. The insoluble dioxime (22.3 g.) was filtered off, and the filtrate evaporated to give 102 g. (66% yield) of 2,2,4,4-tetramethyl-1,3-cyclobutanedione monoxime, M.P. 142–144° C.

*Analysis.*—Calc'd for $C_8H_{13}NO_2$: C, 61.9; H, 8.38; N, 9.04. Found: C, 61.9; H, 8.20; N, 8.80.

Example 2

A mixture of 80 g. of 2,2,4,4-tetramethyl-1,3-cyclobutanedione monoxime, 300 ml. of ethanol and 20 g. of Raney nickel was hydrogenated in a stainless steel autoclave at 130° C. and 1300 p.s.i. pressure for 3 hr. The reaction product was filtered to remove the catalyst and the filtrate was distilled through a 10 in. packed column to give 36.5 g. (49%) of 3-amino-2,2,4,4-tetramethylcyclobutanol, B.P. 92° C. (29 mm.).

*Analysis.*—Calc'd for $C_8H_{17}NO$: C, 67.1; H, 11.9; N, 9.80. Found: C, 67.4; H, 12.3; N, 9.34.

Example 3

A solution of 297 g. of 3-hydroxy-2,2,4,4-tetramethylcyclobutanone and 175 ml. of pyridine in 900 ml. of ethanol was stirred at 15–20° C. while a solution of 144 g. of hydroxylamine hydrochloride in 300 ml. of water was added dropwise over a period of 1 hr. The reaction solution was stirred at room temperature for 12 hr. The low-boiling materials were taken off under vacuum at room temperature, leaving a slurry of crystals. One liter of water was added and the solid was removed by filtration

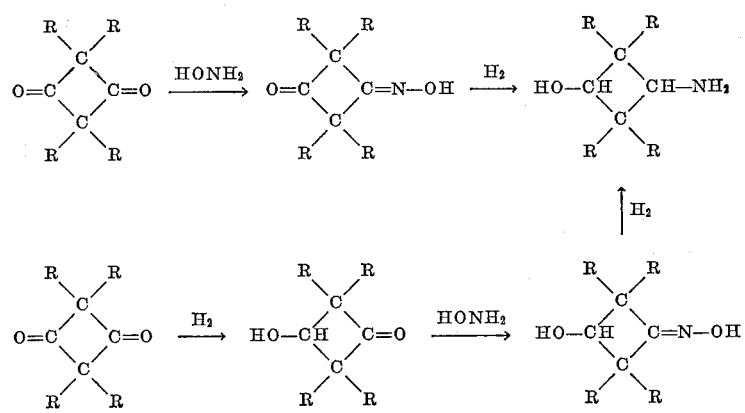

and washed thoroughly with water. After drying, there was obtained 238 g. (72%) of 3-hydroxy-2,2,4,4-tetramethylcyclobutanone oxime, M.P. 147.5–249° C. An analytical sample was recrystallized from a mixture of ethanol and water.

*Analysis.*—Calc'd for $C_8H_{15}NO_2$: C, 61.1; H, 9.6; N, 8.9. Found: C, 61.2; H, 9.8; N, 8.9.

Example 4

A mixture of 200 g. of 3-hydroxy-2,2,4,4-tetramethylcyclobutanone oxime, 1200 ml. of ethanol and 30 g. of Raney nickel was hydrogenated by the method described in Example 2 to give a 58% yield of 3-amino-2,2,4,4-tetramethylcyclobutanol.

Example 5

A solution of 26.8 g. of 2,4-di-n-butyl-2,4-diethyl-1,3-cyclobutanedione monoxime in 500 ml. of tetrahydrofuran was dropped into a well-stirred suspension of 10 g. of lithium aluminum hydride in 100 ml. of tetrahydrofuran over a period of 30 min. The mixture was then refluxed for 6 hr. The complex was decomposed with water and then with 200 ml. of 10% hydrochloric acid. The organic layer was washed with 10% hydrochloric acid, and the combined acid solutions were made alkaline with sodium hydroxide. The alkaline solution was extracted with ether and the extract was dried over anhydrous potassium carbonate. Distillation gave 17.9 g. (71%) of 3-amino-2,4-di-n-butyl-2,4-diethylcyclobutanol, B.P. 110–112° C. (2 mm.).

Example 6

A mixture of 14.3 g. (0.1 mole) of 3-amino-2,2,4,4-tetramethylcyclobutanol and 31.8 g. (0.1 mole) of diphenyl terephthalate was placed in a reaction vessel equipped with a stirrer, a short distillation column and an inlet for nitrogen. A suspension of 0.001 g. of lithium hydride in 0.2 ml. of toluene and 0.002 g. of calcium hydride was added as catalyst. A nitrogen atmosphere was maintained over the reaction mixture. The reactants were heated to 250° C. and the melt was stirred at 250° C. for 30 minutes. Phenol was distilled from the reaction mixture as it formed. A vacuum of 30–60 mm. was applied to further remove the phenol. Finally the temperature was increased to 290° C. and the pressure reduced to 0.5 mm. After 20 minutes of stirring under these conditions, the melt viscosity of the polymer was quite high. The vacuum was bled to nitrogen and the polymer was removed from the flask. A clear, flexible, tough film was cast from a methylene dichloride dope of the polymer. Fibers produced by melt spinning were strong and elastic. The inherent viscosity of the polymer, as measured in a solvent mixture of 60 parts phenol and 40 parts tetrachloroethane, was 0.72. The melting point, as determined under crossed nicols on the hot stage of a microscope, was 281–290° C.

The present invention thus provides a novel class of cyclobutane derivatives.

Although the invention has been described in detail with particular reference to certain typical embodiments thereof, it will be understood that variations and modifications can be effected within the spirit and scope of the invention as described hereinabove and as defined in the appended claims.

We claim:
1. A cyclobutane derivative having the formula

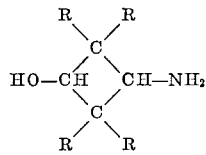

wherein R is an alkyl radical having 1 to 8 carbon atoms.

2.

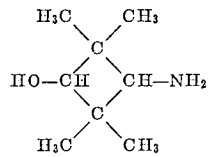

3.

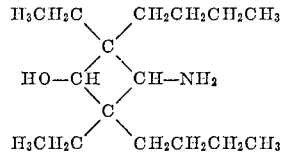

References Cited in the file of this patent

Ingold et al.: J. Chem. Soc. (London), vol. of 1928, pages 365–410.

Granger et al.: Bull. Soc. Chim. France, vol. of 1947, pages 850–853.

Drefahl et al.: Ber. Deut. Chem., vol. 91, pages 283–286 (1958).

Sicher et al.: C.A., vol. 53, pages 1185 to 1188 (1959).